US012107718B1

(12) United States Patent
Sikala

(10) Patent No.: US 12,107,718 B1
(45) Date of Patent: Oct. 1, 2024

(54) METHOD AND SYSTEM OF IMPROVING FAULT TOLERANCE OF NETWORK

(71) Applicant: Elisa Oyj, Helsinki (FI)

(72) Inventor: Pasi Sikala, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/709,073

(22) PCT Filed: Dec. 9, 2022

(86) PCT No.: PCT/FI2022/050822
§ 371 (c)(1),
(2) Date: May 10, 2024

(87) PCT Pub. No.: WO2023/118647
PCT Pub. Date: Jun. 29, 2023

(30) Foreign Application Priority Data

Dec. 20, 2021 (FI) ...................................... 20216306

(51) Int. Cl.
*H04L 43/55* (2022.01)
*H04L 41/0663* (2022.01)

(52) U.S. Cl.
CPC .......... *H04L 41/0663* (2013.01); *H04L 43/55* (2022.05)

(58) Field of Classification Search
None
See application file for complete search history.

(56) References Cited

U.S. PATENT DOCUMENTS 10,819,618 B1  10/2020  Wada et al.
2012/0303348 A1  11/2012  Lu et al.
(Continued)

FOREIGN PATENT DOCUMENTS

| CN | 111835537 A | 10/2020 |
| EP | 3041169 A1 | 7/2016 |
| FI | 130381 B | 6/2023 |

OTHER PUBLICATIONS

European Patent Office, The International Search Report and the Written Opinion of the International Searching Authority, Application No. PCT/FI2022/050822, mailed Mar. 6, 2023, 35 pages.
(Continued)

*Primary Examiner* — Benjamin Lamont
(74) *Attorney, Agent, or Firm* — Ziegler IP Law Group LLC.

(57) ABSTRACT

A method of improving fault tolerance of a network. The network includes a plurality of relay nodes, internet access node and plurality of customer nodes. The method includes identifying first set of relay nodes connecting one of customer nodes to internet access node, selecting a first relay node from first set of relay nodes, to be simulated as a first faulty node in the network, detecting, based on the simulation, number of customer nodes without at least one corresponding network path connecting to the internet access node due to the selection of the first relay node as the first faulty node, determining impact score of the first relay node based on the detected number of customer nodes without at least one corresponding network path connecting to the internet access node, and triggering one or more changes in topology of network according to the impact score to improve fault tolerance of network.

15 Claims, 3 Drawing Sheets

(56) References Cited

U.S. PATENT DOCUMENTS

| | | | |
|---|---|---|---|
| 2016/0191370 A1* | 6/2016 | Wood | H04L 41/122 370/238 |
| 2017/0149616 A1 | 5/2017 | Haines et al. | |
| 2018/0302294 A1* | 10/2018 | Diancin | H04W 24/04 |
| 2021/0058314 A1 | 2/2021 | Wilson et al. | |

OTHER PUBLICATIONS

Finnish Patent and Registration Office, Communication of acceptance, Application No. 202116306, mailed Apr. 18, 2023, 13 pages.

Finnish Patent and Registration Office, Office Action, Application No. 20216306, mailed Jun. 8, 2022, 8 pages.

Finnish Patent and Registration Office, Patent granted, Application No. 20216306, mailed Aug. 7, 2023, 2 pages.

Fu et al., "Topology optimization against cascading failures on wireless sensor networks using a memetic algorithm" Elsevier, Computer Networks, Available online May 21, 2020, https://doi.org/10.1016/j.conmet.2020.107327, 13 pages.

Moosedog Oy, Response to Communication of Acceptance, Application No. 20216306, dated Jun. 29, 2023, 1 page.

Moosedog Oy, Response to Office Action, Application No. 20216306, Dated Sep. 16, 2022, 5 pages.

Oehlers et al., "Graph Metrics for Internet Robustness—A Survey" ARXIV.org, Cornell University Library, Mar. 10, 2021, 43 pages.

Senturk et al., "Connectivity Restoration in Disjoint Wireless Sensor Networks Using Centrality Measures" 10th IEEE International Workshop on Performance and Management of Wireless and Mobile Networks, IEEE, Sep. 8, 2014, DOI: 10.1109/LCNW.2014.6927711, 7 pages.

Finnish Patent and Registration Office, Search Report, Application No. 20216306, mailed Jun. 8, 2022, 2 pages.

\* cited by examiner

METHOD AND SYSTEM OF IMPROVING FAULT TOLERANCE OF NETWORK

TECHNICAL FIELD

The present disclosure relates generally to network topology; and more specifically, to particular method and system for improving fault tolerance of networks.

BACKGROUND

Nowadays, uninterrupted internet access is an essential part of today's society. Internet service providers (ISPs) provide internet access to businesses, households and individuals for a fee. Typically, the ISPs rely on a range of technologies to deliver internet access. The ISPs need to deploy and manage tens or hundreds (or even thousands) of network devices so as to carry traffic efficiently as network complexity grows. Subsequently, the chances of network disruptions increase with one or more of those network devices becoming faulty, as the network complexity increases. Furthermore, due to fact that bandwidth requirements are growing, there is also a requirement to limit deployment costs for the network infrastructure. To limit network disruptions, the ISPs need to understand, quantify, and plan for resilience of these networks due to faulty network devices.

Therefore, in light of the foregoing discussion, there exists a need to overcome the aforementioned drawbacks to make the network more fault tolerant.

SUMMARY

The present disclosure seeks to provide a method of improving fault tolerance of a network, the network comprising a plurality of relay nodes, an internet access node and a plurality of customer nodes. The present disclosure also seeks to provide a system of improving fault tolerance of a network, the network comprising a plurality of relay nodes, an internet access node and a plurality of customer nodes. An aim of the present disclosure is to provide a solution that overcomes at least partially the problems encountered in prior art.

In one aspect, the present disclosure provides a method of improving fault tolerance of a network, the network comprising a plurality of relay nodes, an internet access node and a plurality of customer nodes, the method comprising
- identifying a first set of relay nodes connecting one of the customer nodes to the internet access node;
- selecting a first relay node from the first set of relay nodes, to be simulated as a first faulty node in the network;
- detecting, based on the simulation, a number of customer nodes without at least one corresponding network path connecting to the internet access node due to the selection of the first relay node as the first faulty node;
- determining an impact score of the first relay node based on the detected number of customer nodes without the at least one corresponding network path connecting to the internet access node; and
- triggering one or more changes in topology of the network according to the impact score to improve the fault tolerance of the network.

In another aspect, the present disclosure provides a system for improving fault tolerance of a network, the network comprising a plurality of relay nodes, an internet access node and a plurality of customer nodes, the system comprising:
- a network component configured to ping the plurality of relay nodes, to determine a topology of the network;
- a memory configured to store information about the determined topology of the network; and
- a controller in signal communication with the memory, the controller configured to:
  - identify a first set of relay nodes connecting one of the customer nodes to the internet access node, based on the topology of the network;
  - select a first relay node from the first set of relay nodes, to be simulated as a first faulty node in the network;
  - detect, based on the simulation, a number of customer nodes without at least one corresponding network path connecting to the internet access node due to the selection of the first relay node as the first faulty node, based on the topology of the network;
  - determine an impact score of the first relay node based on the detected number of customer nodes without the at least one corresponding network path connecting to the internet access node; and
  - trigger one or more changes in the topology of the network according to the impact score to improve the fault tolerance of the network.

Embodiments of the present disclosure substantially eliminate or at least partially address the aforementioned problems in the prior art, and enable efficient topology in the network. Embodiments of the present disclosure eliminate the need for manual changes in the topology of the network. Embodiments of the present disclosure provide a solution that ensures dynamic load balancing and redistribution of the signal from the customer node among other relay nodes to improve overall performance. Further, the embodiments of the present disclosure allow that only the identified relay nodes are simulated for being faulty nodes, thus, making the system efficient and faster.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
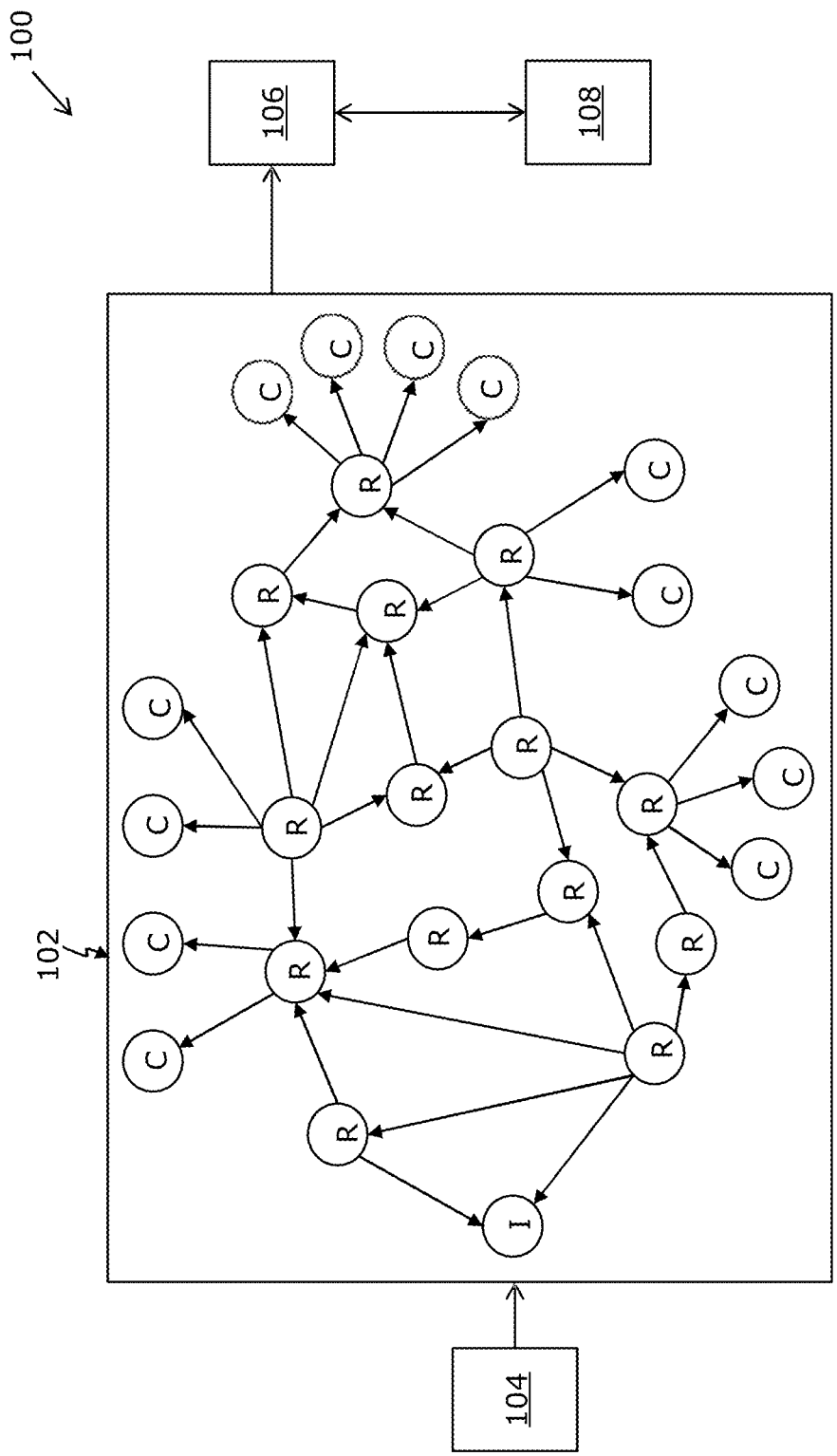
FIG. 1 is a block diagram depicting a system for improving fault tolerance of a network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, the present disclosure provides a method of improving fault tolerance of a network, the network comprising a plurality of relay nodes, an internet access node and a plurality of customer nodes, the method comprising
 identifying a first set of relay nodes connecting one of the customer nodes to the internet access node;
 selecting a first relay node from the first set of relay nodes, to be simulated as a first faulty node in the network;
 detecting, based on the simulation, a number of customer nodes without at least one corresponding network path connecting to the internet access node due to the selection of the first relay node as the first faulty node;
 determining an impact score of the first relay node based on the detected number of customer nodes without the at least one corresponding network path connecting to the internet access node; and
 triggering one or more changes in topology of the network according to the impact score to improve the fault tolerance of the network.

In another aspect, the present disclosure provides a system for improving fault tolerance of a network, the network comprising a plurality of relay nodes, an internet access node and a plurality of customer nodes, the system comprising:
 a network component configured to ping the plurality of relay nodes, to determine a topology of the network;
 a memory configured to store information about the determined topology of the network; and
 a controller in signal communication with the memory, the controller configured to:
  identify a first set of relay nodes connecting one of the customer nodes to the internet access node, based on the topology of the network;
  select a first relay node from the first set of relay nodes, to be simulated as a first faulty node in the network;
  detect, based on the simulation, a number of customer nodes without at least one corresponding network path connecting to the internet access node due to the selection of the first relay node as the first faulty node, based on the topology of the network;
  determine an impact score of the first relay node based on the detected number of customer nodes without the at least one corresponding network path connecting to the internet access node; and
  trigger one or more changes in the topology of the network according to the impact score to improve the fault tolerance of the network.

Centrality metrics are used in modelling performance of the networks for proper communication. Herein, a hidden stable network structure is uncovered in delay tolerant networks using ideas from graph theory and social networks resulting in introduction of a routing algorithm. However, the current networks consider looped routing strategies, which leads to delay in prediction of congestion in communication networks. Furthermore, two-loop general architecture is used for control of the network and provide directions to design appropriate control algorithms in each control loop, thereby eliminating single points of failure, traffic bottlenecks, as well as improving overall throughput and ease of management. However, the two-loop general architecture needs a thorough planning of both physical and logical network to modernize the network.

The present disclosure provides the aforementioned method and system for improving fault tolerance of the network. Herein, the nodes are simulated to be faulty to determine their impact on the network with such fault condition, so that preventive steps could be taken to improve fault tolerance of the network. Furthermore, single points of failure are avoided, emergency service tickets are provided in order to treat the faulty nodes so as shortest path from the customer nodes to internet access node is maintained. This way, the network is made robust by changing topology of the network if required, thereby ensuring a continuous flow of signal between the customer nodes to the internet access nodes via a plurality of relay nodes.

Throughout the present disclosure, the term "network" refers to an arrangement of interconnected programmable and/or non-programmable components that are configured to facilitate data communication between one or more electronic devices and/or databases, whether available or known at the time of filing or as later developed. Furthermore, the network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed.

The network comprises a plurality of relay nodes, an internet access node and a plurality of customer nodes. Herein, the term "customer node" may either be data communication equipment such as a modem, hub, bridge or switch, or a data terminal equipment such as a host computer. Furthermore, the term "relay node" enables data transmissions or redistribution from the customer node. Herein, the relay nodes are either programmed or engineered to recognize, process and forward transmissions to other relay nodes. Additionally, the term "internet access node" may be host computers configured as physical network nodes, wherein the internet access node is identified by an internet protocol (IP) address.

The method comprises identifying a first set of relay nodes connecting one of the customer nodes to the internet access node. Herein, the customer nodes and the internet access nodes cannot communicate to each other directly as distance between the customer nodes and the internet access nodes is greater than the transmission range of both of them, hence the need to identify the first set of relay node connecting one of the customer nodes to the internet access node. As may be understood, each of the customer node is connected to the internet access node through a set of relay nodes among the plurality of relay nodes in the network, and such set of relay nodes is identified as the first set of relay nodes.

Optionally, the first set of relay nodes are identified as the relay nodes on a determined network path, using shortest path algorithm, connecting the said one of the customer nodes and the internet access node. Herein, shortest path algorithm maybe Dijkstra's algorithm, Bellman-Ford algorithm, Floyd-Warshall algorithm, Johnson's algorithm and so forth. Typically, the Dijkstra's algorithm is an algorithm for finding the shortest paths between one of the customer nodes and the internet access nodes on the determined network path. Furthermore, the shortest paths may be identified from one of the customer nodes to the internet access node via the first set of relay nodes by stopping the shortest path algorithm once the shortest path to the internet access node is determined. Furthermore, the Dijkstra's algorithm finds the shortest path from one of the customer nodes to the internet access node via the first set of relay nodes within a same topology. Moreover, the algorithm works to find the shortest path to every single reachable customer node and the first set of relay nodes, provided the topology does not change. Subsequently, the shortest path algorithm runs until all of the first set of relay nodes have been visited. Hence, the Dijkstra's algorithm needs to run only once, thereby saving results to be used repeatedly without re-running the shortest path algorithm, in case the topology has not undergone any changes. Alternatively, the Bellman-Ford algorithm works to find the shortest path between one of the customer nodes to the internet access node through all the relay nodes present in the topology. Advantageously, the Bellman-Ford algorithm is able to detect negative cycles and report on their existence, wherein the term "negative cycle" refers to a topology where edges of graph structure in the topology sums to a negative value. Furthermore, alternatively, the Floyd-Warshall calculates the shortest path between every pair of nodes in the topology, rather than only calculating from one of the customer nodes. Additionally, alternatively, the Johnson's algorithm work on the topology comprising sparse graph structures, wherein the sparse graph structures comprise fewer edges, thereby generating a route at a faster speed.

The method comprises selecting a first relay node from the first set of relay nodes, to be simulated as a first faulty node in the network. Herein, the first faulty node may be simulated using programming language, such as Python®, or using a programming platform to design and analyze the network, such as MATLAB®. The first relay node is simulated as the first faulty node, in order to determine whether it is a point of failure, and to optimize distribution of information if required.

Optionally, the method further comprises computing a centrality score for each of the plurality of relay nodes, indicative of importance of the corresponding relay node in the network, and wherein the first relay node to be simulated as the first faulty node is selected from the first set of relay nodes based on the centrality score thereof. Herein, the centrality score is a measure of influence of each of the plurality of relay nodes in the network. Furthermore, the centrality score assigns relative scores to the plurality of relay nodes, wherein typically, connections to the plurality of relay nodes having a high centrality score contribute more to the centrality score of the plurality of the relay nodes that is being considered than equal connections to the plurality of nodes comprising a low centrality score. Typically, the centrality score can be measured using four centrality measures, wherein the centrality measures may be, but not limited to, namely, degree centrality, betweenness centrality, closeness centrality and eigenvector centrality, and are used depending on context of the network.

Optionally, the centrality score is determined based on a betweenness centrality algorithm. Herein, the betweenness centrality algorithm is a way of detecting magnitude of influence the relay node has over the flow of information in the graph structure of the topology. Furthermore, the betweenness centrality algorithm is used to find the relay nodes that serve as a bridge from one part of the graph structure to another. Herein, the betweenness centrality algorithm calculates unweighted shortest paths between all pairs of relay nodes present in the network. Subsequently, each relay node receives the centrality score, based on the number of shortest paths that pass through one of the customer nodes to the internet access node via the first set of relay nodes. Additionally, the first set of relay nodes that more frequently lie on shortest paths between other relay nodes will have higher betweenness centrality scores.

Optionally, the relay node is selected to be the first relay node based on the corresponding centrality score exceeding a predetermined threshold. In a first instance, an exemplary network comprises two relay nodes, namely, "Relay Node A" and "Relay Node B", wherein the "Relay Node A" is configured to have fifty connections, and the "Relay Node B" is configured to have ten connections. Herein, the number of connections are translated into centrality scores, which are further normalized into a 0-1 scale. For example, the predetermined threshold of the network may be set to 0.5. Subsequently, the "Relay Node A" comprises a centrality score higher than the predetermined threshold, wherein the "Relay Node A" for instance, may have a centrality score of 0.9, thereby making the "Relay Node A" more prone to faults as the centrality score provides information as to the critical nature of the "Relay Node A" to the network. Thereafter, "Relay Node B" comprises a centrality score lower than the predetermined threshold, thereby removing it from being considered as a faulty node. Consequently, the "Relay Node A" is selected to be simulated as the faulty node so as to anticipate and provide a backup set of relay nodes, based on the corresponding centrality score, for uninterrupted transfer of signal from the customer node to the internet access nodes.

The method comprises detecting, based on the simulation, a number of customer nodes without at least one corresponding network path connecting to the internet access node due to the selection of the first relay node as the first faulty node. Herein, the centrality score helps in detecting the influence of the first relay node over the flow of information, and derives the number of customer nodes that are directly connected to internet access node. Continuing from the first instance, the "Relay Node A" is simulated as the faulty node, due to the "Relay Node A" having fifty connections, making it a node which is prone to faults. In such a case, the number of customer nodes connected to the "Relay Node A" are also affected, as they are unable to access the "Relay Node A" for transfer of signal to the internet access nodes with no corresponding network path being available. Hence, the number of customer nodes affected by the first faulty node is anticipated, based on the simulation, so as to provide alternative network paths to connect the affected number of customer nodes to the internet access node.

Optionally, the method further comprises firstly selecting a second relay node from the first set of relay nodes, to be simulated as a second faulty node in the network. Herein, the network may comprise multiple sets of relay nodes from where multiple relay nodes are chosen, thereby simulating multiple faulty nodes in the network. Secondly, a second number of customer nodes are detected, based on the simulation, without at least one corresponding network path connecting to the internet access node due to the selection of the first relay node as the first faulty node and the second relay node as the second faulty node. Herein, the first faulty node and the second faulty node are removed based on the simulation, wherein the centrality score helps in detecting the influence of the relay nodes over the flow of information, and derives the number of customer nodes that are directly connected to the internet access node therethrough. Thirdly, the impact score of the first relay node and the second relay node is determined, in combination, based on the detected second number of customer nodes without the at least one corresponding network path connecting to the internet access node. Herein, the impact score of the first relay node, the second relay node and subsequent relay nodes are added, based on the number of combined customer nodes affected thereby. In general the method can comprise selecting an arbitrary amount of relay nodes (such as 1, 10, 100, 1000) as faulty nodes and analyzing impact of those faulty nodes to number of customer nodes which have or does not have Internet access. The selection and simulation can be carried in sequential manner for example by dropping one node at the time to see which nodes are the once which are more critical in case of multiple nodes down. Technical effect of the method is that network operator can predict possible maintenance work and also can trigger topology changes before problems happen or to minimize possible problems.

Optionally, the method further comprises determining a number of available network paths from the said one of the customer nodes to the internet access node without having any faulty node therein, and wherein triggering of the one or more changes in the topology of the network are further based on the said determined number of available network paths. Herein, the number of customer nodes affected by the simulated faulty node undergoes a change in topology so as to transfer the signal to the internet access node via a set of relay nodes that are less critical in nature. Furthermore, alternative paths from the number of available network paths are utilized, wherein the shortest path algorithm is simultaneously used to determine the next shortest path from the customer node to the internet access node.

The method comprises determining an impact score of the first relay node based on the detected number of customer nodes without the at least one corresponding network path connecting to the internet access node. Herein, the impact score measures rank or quantifies influence of every relay node within the plurality of relay nodes within the topology. Additionally, the impact score is dependent on the topology of the network, and quantifies difference between a pair of relay nodes. Herein, the impact of the first relay node based on the detected number of customer nodes is added, over the entire graph structure of the topology, to predict outcome of the network without the at least one corresponding network path connected to the internet access node.

The method comprises triggering one or more changes in topology of the network according to the impact score to improve the fault tolerance of the network. Herein, in one example, the topology allows for dynamic network routing, wherein the signal from the customer node to the internet access node has multiple network paths it can travel across. Hence, according to the impact score, if one of the relay nodes is found to be the faulty node, the signal from the customer node takes another network path to reach the internet access node, thereby improving the fault tolerance of the network.

Optionally, triggering the one or more changes in the topology of the network are further based on one or more of: balancing a load in the network, minimizing criticality of the network. Herein, changing the topology of the network by simulating the faulty nodes and determining alternative paths for the customer nodes ensures dynamic load balancing wherein redistribution of the signal from the customer node among other relay nodes to improve overall performance. Additionally, criticality of the network is a graph-theoretic metric that quantifies robustness of the network, that is designed to capture effect of changes taking place in the network, wherein the centrality score and the impact score of the plurality of relay nodes are calculated and ranked based on their contribution to performance of the overall topology. Moreover, minimizing criticality of the network is ability of the network to maintain its functionality when some nodes or edges are removed due to targeted attacks or random failures. Typically, notion of the criticality of the network is derived from probabilistic definition of betweenness, which is defined based on random walks in the graph structure, as main metric to quantify survival value of the relay node of the network with respect to changes in the topology and dynamics within the network.

Optionally, the one or more changes in the topology of the network comprises one or more of: adding new relay nodes in the network, prioritizing servicing of the relay nodes with relatively higher impact score, setting up backup for the relay nodes with relatively higher impact score. Herein, the new relay nodes are added in the network to recover lost connectivity of the customer nodes to the internet access node. Furthermore, the relay nodes with relatively higher impact score are prioritized for servicing as those are the network paths that are used more frequently for transmission of information from the customer nodes to the internet access node. Moreover, backups are set for relay nodes with relatively higher impact score so that they can used when the relay node turns out to be a faulty relay node. Herein, the backup for the relay nodes should cover all the relay nodes in the network, wherein the backup nodes communicate with each other as well as with the relay nodes therewith, thereby making the network connected as a two-tiered network.

Throughout the present disclosure, the term "network component" comprises both physical components and software components required for installing computer networks. Herein, the physical components include hardware components such as, but not limited to, server, client, peer, transmission medium, routers, switches, network interface cards and connecting devices. Additionally, the software components may include operating system and protocols. Typically, the network component makes it possible to transfer data and information from one device to another and make easy communication between two different networks.

Throughout the present disclosure, the term "memory" refers to a volatile or persistent medium, such as an electrical circuit, magnetic disk, virtual memory or optical disk, in which a computer can store data or software for any duration. Optionally, the memory is non-volatile mass storage such as physical storage media. Furthermore, a single memory may encompass and, in a scenario, wherein computing system is distributed, the processing, memory and/or storage capability may be distributed as well.

Throughout the present disclosure, the term "controller" refers to a computational device that is operable to respond to and process information. In an example, the controller may be an embedded microcontroller, a microprocessor, computer or a portable computing device. Herein, the controller is in signal communication with the memory. Furthermore, the controller may be a digital circuit that manages the flow of data going to and from the memory.

The present disclosure also relates to the system as described above. Various embodiments and variants disclosed above apply mutatis mutandis to the system.

Optionally, the controller is configured to identify the first set of relay nodes as the relay nodes on a determined network path, using shortest path algorithm, connecting the said one of the customer nodes and the internet access node.

Optionally, the controller is further configured to compute a centrality score for each of the plurality of relay nodes, indicative of importance of the corresponding relay node in the network, and select the first relay node to be simulated as the first faulty node from the first set of relay nodes based on the centrality score thereof.

Optionally, the controller is further configured to select the relay node to be the first relay node based on the corresponding centrality score exceeding a predetermined threshold.

Optionally, the controller is further configured to determine a number of available network paths from the said one of the customer nodes to the internet access node without having any faulty node therein, and trigger the one or more changes in the topology of the network based on the said determined number of available network paths.

Optionally, the controller is further configured to select a second relay node from the first set of relay nodes, to be simulated as a second faulty node in the network, detect, based on the simulation, a second number of customer nodes without at least one corresponding network path connecting to the internet access node due to the selection of the first relay node as the first faulty node and the second relay node as the second faulty node, and determine the impact score of the first relay node and the second relay node, in combination, based on the detected second number of customer nodes without the at least one corresponding network path connecting to the internet access node.

Optionally, the controller is further configured to trigger the one or more changes in the topology of the network based on one or more of: balancing a load in the network, minimizing criticality of the network.

Optionally, the one or more changes in the topology of the network comprises one or more of: adding new relay nodes in the network, prioritizing servicing of the relay nodes with relatively higher impact score, setting up backup for the relay nodes with relatively higher impact score.

DETAILED DESCRIPTION OF THE DRAWINGS

Referring to FIG. 1, a block diagram is shown depicting a system 100 for improving fault tolerance of a network 102, in accordance with an embodiment of the present disclosure. Herein, the system 100 comprises a network 102 comprising a plurality of relay nodes, denoted as "R", an internet access node, denoted as "I", and a plurality of customer nodes, denoted as "C". A network component 104 is configured to ping the plurality of relay nodes "R", to determine the topology of the network 102. Furthermore, a memory 106 is configured to store information about the determined topology of the network 102. Thereafter, a controller 108 is in signal communication with the memory 106.

Figure 2:
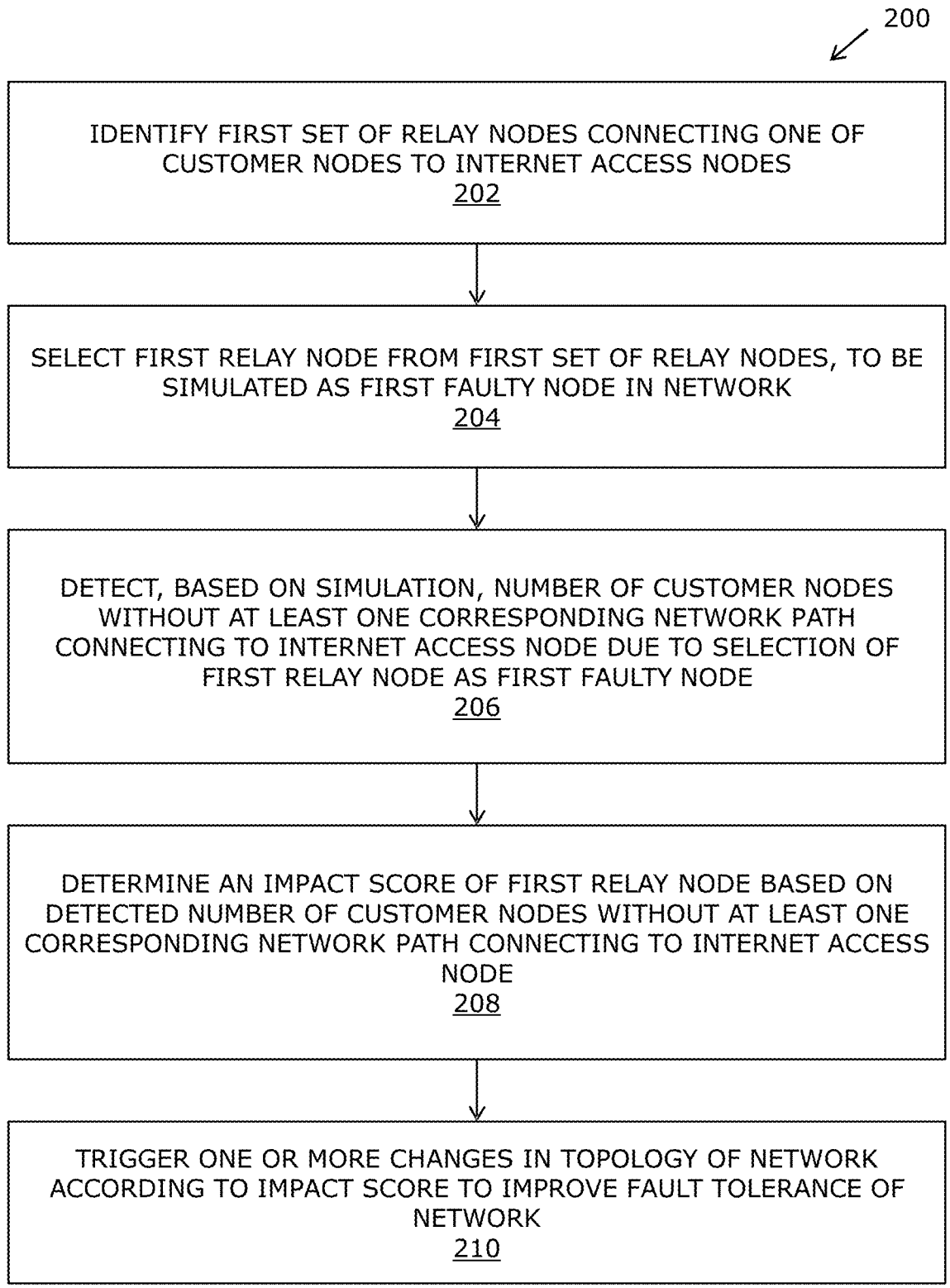
FIG. 2 is a flowchart depicting steps of a method of improving fault tolerance of a network, in accordance with an embodiment of the present disclosure.

Referring to FIG. 2, illustrated is a flowchart 200 depicting steps of a method of improving fault tolerance of a network, in accordance with an embodiment of the present disclosure. At step 202, a first set of relay nodes is identified connecting one of the customer nodes to the internet access node. At step 204, a first relay node is selected from the first set of relay nodes, to be simulated as a first faulty node in the network. At step 206, a number of customer nodes is detected, based on the simulation, without at least one corresponding network path connecting to the internet access node due to the selection of the first relay node as the first faulty node. At step 208, an impact score of the first relay node is determined based on the detected number of customer nodes without the at least one corresponding network path connecting to the internet access node. At step 210, one or more changes in topology of the network is triggered according to the impact score to improve the fault tolerance of the network.

Figure 3A:
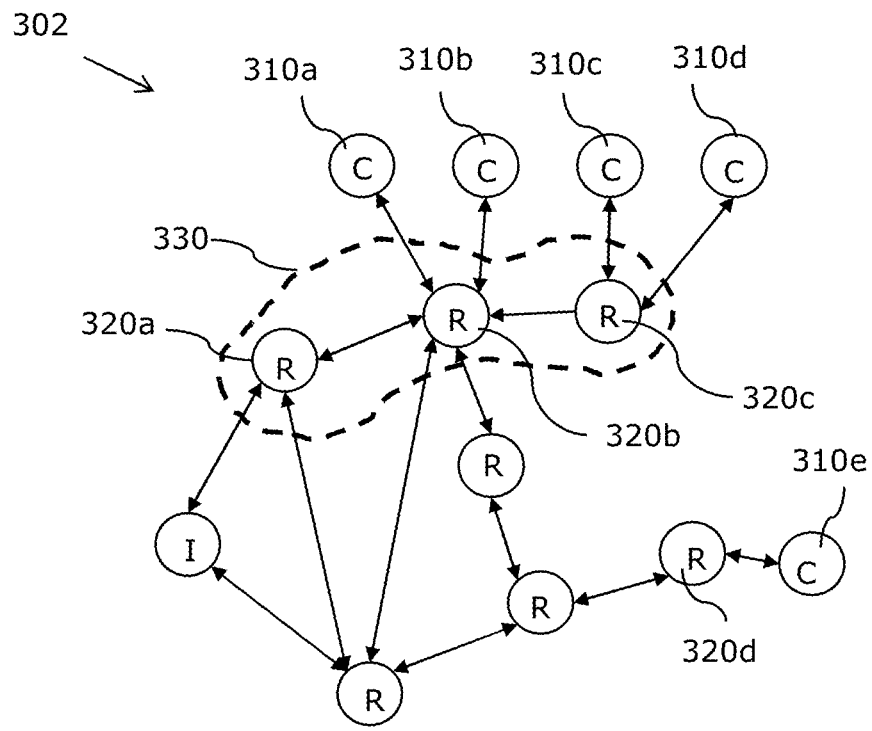
FIGS. 3A and 3B are illustrations of example simulations to find impact scores.
Figure 3B:
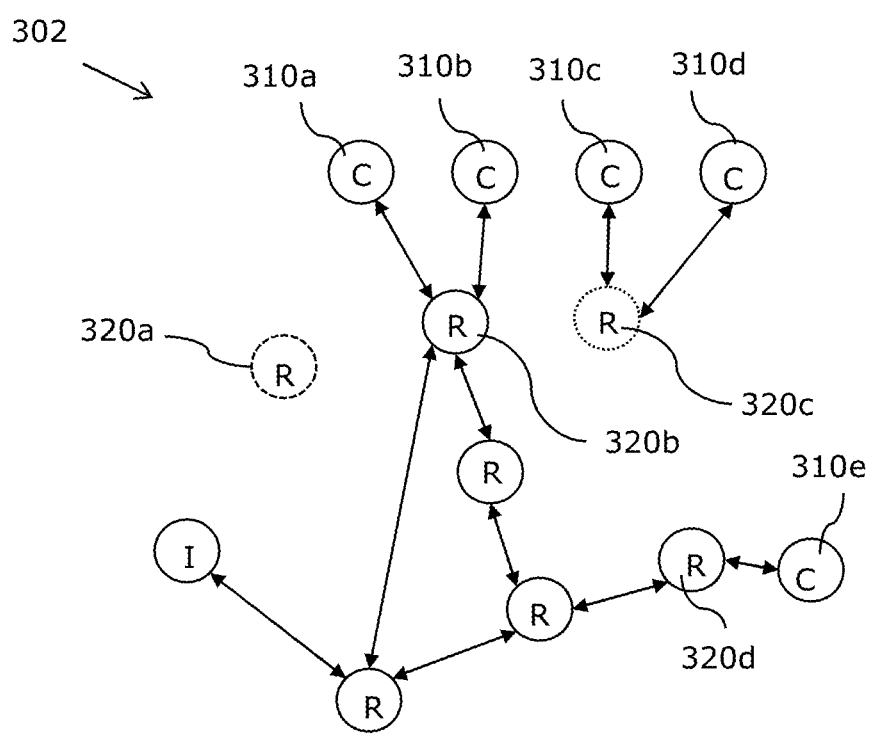

FIG. 3A and FIG. 3B are illustrations of a network 302. The network comprises a plurality of relay nodes marked with R, an Internet access node I and plurality of customer nodes C. An identified a first set of relay nodes 320a, 320b and 320c is marked with dashed line 330. The relay node 320b connects customer nodes 310a and 310b to the internet access node I via relay node 302a. Customer nodes 310c and 310d are connected to Internet node via relay nodes 320c, 320b and 320a. A customer node 310a is connected to the network 302 via relay node 320d. Possible routes for Internet traffic to be routed is designated with arrows connecting the relay nodes. In one example the relay nodes are routers.

FIG. 3B illustrates a simulation on which a first relay node 320c from the first set of relay nodes 320a, 320b and 320c is selected to be a faulty node. Based on simulation two customer nodes would be without at least one corresponding network path connecting to the internet access node if said node 320c would be faulty. Furthermore, it can be seen that if the first relay node is selected to be the relay node 320a it has no direct, immediate impact on the access to internet. If according other example relay node 320d is not available it has impact on one customer node 310e. The relay node 320b on the other hand would have impact to total of four customer nodes since customer nodes 310a and 310b are directly behind the said relay node and indirectly, via the relay node 320c, customer nodes 310c and 310d also. This way an impact score can be determined to the first relay node. In present example the relay node 320a has no impact, the relay node 320b has impact score of 4, the relay node 320c has impact score 4 and the relay node 320d impact score of 1. Since the relay node 320b was found as the most critical based on above simulation a triggering of change on topology can be planned and implemented. Technical effect of this is thus finding where to allocate resources related to topology changes and/or trigger routing table changes. As an example, additional connection via the relay node 320d to the relay node 320c could be one possible triggered change.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of improving fault tolerance of a network, the network comprising a plurality of relay nodes, an internet access node and a plurality of customer nodes, wherein the method comprising:
identifying a first set of relay nodes connecting one of the customer nodes to the internet access node;
selecting a first relay node from the first set of relay nodes, to be simulated as a first faulty node in the network;
detecting, based on the simulation, a number of customer nodes without at least one corresponding network path connecting to the internet access node due to the selection of the first relay node as the first faulty node;
determining an impact score of the first relay node based on the detected number of customer nodes without the at least one corresponding network path connecting to the internet access node; and
triggering one or more changes in topology of the network according to the impact score to improve the fault tolerance of the network,
wherein the method comprises computing a centrality score for each of the plurality of relay nodes, indicative of importance of the corresponding relay node in the network, and wherein the first relay node to be simulated as the first faulty node is selected from the first set of relay nodes based on the centrality score thereof.

2. The method of claim 1, wherein the first set of relay nodes are identified as the relay nodes on a determined network path, using shortest path algorithm, connecting the said one of the customer nodes and the internet access node.

3. The method of claim 2, wherein the relay node is selected to be the first relay node based on the corresponding centrality score exceeding a predetermined threshold.

4. The method of claim 2, wherein the centrality score is determined based on a betweenness centrality algorithm.

5. The method of claim 1 further comprising:
selecting a second relay node from the first set of relay nodes, to be simulated as a second faulty node in the network;
detecting, based on the simulation, a second number of customer nodes without at least one corresponding network path connecting to the internet access node due to the selection of the first relay node as the first faulty node and the second relay node as the second faulty node; and
determining the impact score of the first relay node and the second relay node, in combination, based on the detected second number of customer nodes without the at least one corresponding network path connecting to the internet access node.

6. The method of claim 1 further comprising determining a number of available network paths from the said one of the customer nodes to the internet access node without having any faulty node therein, and wherein triggering of the one or more changes in the topology of the network are further based on the said determined number of available network paths.

7. The method of claim 1, wherein triggering the one or more changes in the topology of the network are further based on one or more of: balancing a load in the network, minimizing criticality of the network.

8. The method of claim 1, wherein the one or more changes in the topology of the network comprises one or more of: adding new relay nodes in the network, prioritizing servicing of the relay nodes with relatively higher impact score, setting up backup for the relay nodes with relatively higher impact score.

9. A system for improving fault tolerance of a network, the network comprising a plurality of relay nodes, an internet access node and a plurality of customer nodes, the system comprising:
a network component configured to ping the plurality of relay nodes, to determine a topology of the network;
a memory configured to store information about the determined topology of the network; and
a controller in signal communication with the memory, wherein the controller configured to:
identify a first set of relay nodes connecting one of the customer nodes to the internet access node, based on the topology of the network;
select a first relay node from the first set of relay nodes, to be simulated as a first faulty node in the network;
detect, based on the simulation, a number of customer nodes without at least one corresponding network path connecting to the internet access node due to the selection of the first relay node as the first faulty node, based on the topology of the network;
determine an impact score of the first relay node based on the detected number of customer nodes without the at least one corresponding network path connecting to the internet access node; and
trigger one or more changes in the topology of the network according to the impact score to improve the fault tolerance of the network
wherein that the controller is further configured to:
compute a centrality score for each of the plurality of relay nodes, indicative of importance of the corresponding relay node in the network; and
select the first relay node to be simulated as the first faulty node from the first set of relay nodes based on the centrality score thereof.

10. The system of claim 9, wherein the controller is configured to identify the first set of relay nodes as the relay nodes on a determined network path, using shortest path algorithm, connecting the said one of the customer nodes and the internet access node.

11. The system of claim 9, wherein the controller is further configured to select the relay node to be the first relay node based on the corresponding centrality score exceeding a predetermined threshold.

12. The system of claim 9, wherein the controller is further configured to:
determine a number of available network paths from the said one of the customer nodes to the internet access node without having any faulty node therein; and
trigger the one or more changes in the topology of the network based on the said determined number of available network paths.

13. The system of claim 9, wherein the controller is further configured to:
select a second relay node from the first set of relay nodes, to be simulated as a second faulty node in the network;
detect, based on the simulation, a second number of customer nodes without at least one corresponding network path connecting to the internet access node due to the selection of the first relay node as the first faulty node and the second relay node as the second faulty node; and
determine the impact score of the first relay node and the second relay node, in combination, based on the detected second number of customer nodes without the at least one corresponding network path connecting to the internet access node.

14. The system of claim 9, wherein the controller is further configured to trigger the one or more changes in the topology of the network based on one or more of: balancing a load in the network, minimizing criticality of the network.

15. The system of claim 9, wherein the one or more changes in the topology of the network comprises one or more of: adding new relay nodes in the network, prioritizing servicing of the relay nodes with relatively higher impact score, setting up backup for the relay nodes with relatively higher impact score.

* * * * *